United States Patent [19]

Langfeld

[11] Patent Number: 4,996,302

[45] Date of Patent: Feb. 26, 1991

[54] PROCESS FOR THE PREPARATION OF POLYAZO DYES

[75] Inventor: Horst Langfeld, Grenzach-Wyhlen, Fed. Rep. of Germany

[73] Assignee: Ciba-Geigy Corporation, Ardsley, N.Y.

[21] Appl. No.: 280,802

[22] Filed: Dec. 7, 1988

[30] Foreign Application Priority Data

Dec. 16, 1987 [CH] Switzerland .................. 4923/87

[51] Int. Cl.$^5$ .................. C09B 33/24; C09B 33/18; C09B 45/24; C09B 45/01
[52] U.S. Cl. .................. 534/582; 534/581; 534/583; 534/584; 534/602; 534/677; 534/678; 534/680; 534/684; 534/685
[58] Field of Search .................. 534/677, 678, 680, 684, 534/685, 584, 581, 582, 583, 602

[56] References Cited

U.S. PATENT DOCUMENTS

| | | | |
|---|---|---|---|
| 1,612,850 | 2/1927 | Flett | 534/677 |
| 2,045,090 | 6/1936 | Lange et al. | 534/685 X |
| 2,152,652 | 4/1939 | Lange | 534/685 X |
| 2,183,673 | 12/1939 | Dobler et al. | 260/145 |
| 2,257,165 | 9/1941 | Fellmer | 534/685 X |
| 2,830,979 | 4/1958 | Goebel et al. | 534/685 X |
| 3,189,593 | 6/1965 | Wicki | 260/144 |
| 3,380,989 | 4/1968 | Remy | 534/685 X |
| 3,406,160 | 10/1968 | Wicki | 534/145 |
| 3,862,118 | 7/1975 | Goebel | 534/685 |
| 4,120,854 | 10/1978 | Wicki | 534/677 |
| 4,263,229 | 4/1981 | Struder et al. | 534/685 X |
| 4,491,543 | 1/1985 | Bergmann et al. | 534/684 X |
| 4,563,520 | 1/1986 | Bergmann et al. | 534/678 |

FOREIGN PATENT DOCUMENTS

| | | | |
|---|---|---|---|
| 629743 | 4/1936 | Fed. Rep. of Germany | 534/677 |
| 904335 | 7/1949 | Fed. Rep. of Germany | 534/677 |
| 3529250 | 2/1987 | Fed. Rep. of Germany | 534/685 |
| 2163675 | 7/1973 | France | 534/685 |
| 779486 | 7/1957 | United Kingdom | 534/685 |
| 1306527 | 2/1973 | United Kingdom | 534/677 |
| 1306836 | 2/1973 | United Kingdom | 534/677 |
| 1365798 | 9/1974 | United Kingdom | 534/677 |

OTHER PUBLICATIONS

Chem. Abstract, vol. 50; 11680c.
Chem. Abstract, vol. 106; 197825j.
Chem. Abstract, vol. 101, 231934c. (1984), Peragiewicz.

*Primary Examiner*—Floyd D. Higel
*Attorney, Agent, or Firm*—Kevin T. Mansfield

[57] ABSTRACT

A process for the preparation of polyazo dyes is described which comprises
(a) diazotizing a compound of the formula

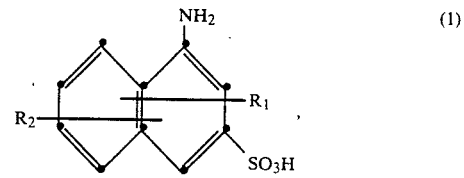

and coupling the product onto a compound of the formula

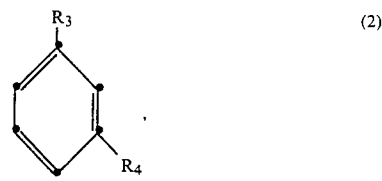

(b) diazotizing a compound of the formula

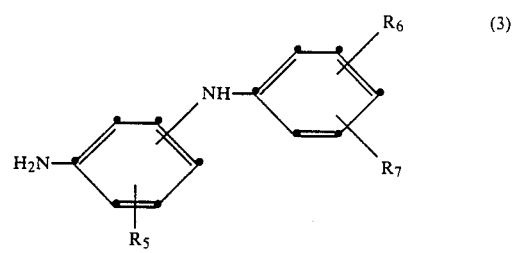

and coupling the product onto the product obtained according to (a);
(c) diazotizing a compound of the formula

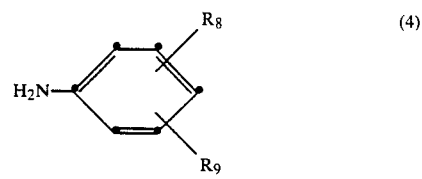

and coupling the product onto the product obtained according to (b);
(d) if desired, coupling of a further diazotized compound of the formula (3) onto the product obtained according to (c); and
(e) if desired, metallizing the product obtained according to (c) or (d); and in which the symbols are as defined in claim 1. The polyazo dyes obtainable by the process are suitable for dyeing a wide range of textile and non-textile materials and, in particular, for dyeing leather.

14 Claims, No Drawings

PROCESS FOR THE PREPARATION OF POLYAZO DYES

The invention relates to a process for the preparation of polyazo dyes and also to the use of the dyes prepared by the process for dyeing a wide range of textile and non-textile materials, in particular leather.

The invention in particular provides a process for the preparation of polyazo dyes, which comprises
(a) diazotizing a compound of the formula

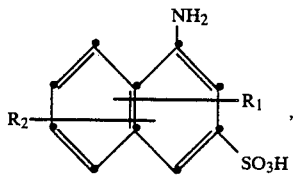

in which $R_1$ and $R_2$, independently of one another, are hydrogen, hydroxyl, nitro, sulfo, halogen, $C_1$-$C_4$alkyl or $C_1$-$C_4$alkoxy and coupling the product onto a compound of the formula

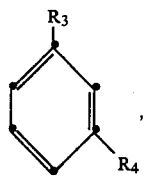

in which $R_3$ and $R_4$, independently of one another, are hydroxyl or amino,
(b) diazotizing a compound of the formula

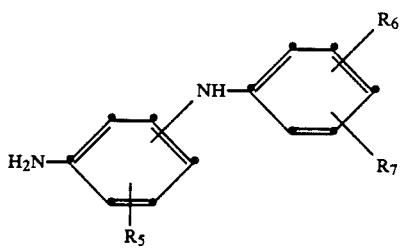

in which $R_5$ and $R_6$, independently of one another, are hydrogen or sulfo and $R_7$ is nitro, $C_1$-$C_4$alkyl, $C_1$-$C_4$alkoxy or halogen and coupling the product onto the product obtained according to (a),
(c) diazotizing a compound of the formula

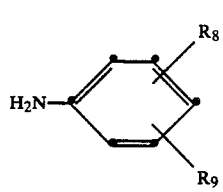

in which $R_8$ is hydrogen, $C_1$-$C_4$alkyl, $C_1$-$C_4$alkoxy, halogen, carboxy or sulfo and $R_9$ independently has the meaning of $R_8$ or is nitro and coupling the product onto the product obtained according to (b),
(d) diazotizing, if desired, a further compound of the abovementioned formula (3) and coupling the product onto the product obtained according to (c) and (e) metallizing, if desired, the product obtained according to (c) or (d).

In the compounds of the formula (1), $R_1$ is preferably hydrogen or hydroxyl and $R_2$ is preferably hydrogen, nitro, sulfo, chlorine, methyl or methoxy.

Examples of preferred compounds of the formula (1) are 1-hydroxy-8-aminonaphthalene-3,6-disulfonic acid and, in particular, compounds of the formula

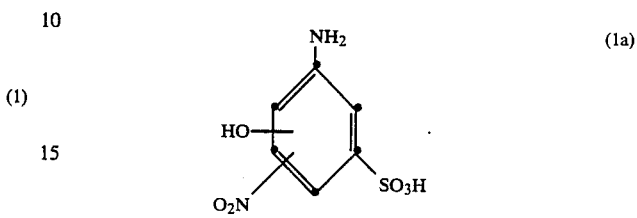

A particularly preferred embodiment of the present invention relates to a process in which 2-amino-6-nitrophenol-4-sulfonic acid or 2-amino-4-nitrophenol-6-sulfonic acid is diazotized in (a) and coupled onto a compound of the formula (2).

Suitable compounds of the formula (2) are 1,3-diaminobenzene, 3-aminophenol and 1,3-dihydroxybenzene; in this embodiment, the use of 1,3-dihydroxy-benzene, that is, $R_3$ and $R_4$ in the formula (2) each are preferably hydroxyl, is preferred.

$R_5$ in the formula (3) is preferably hydrogen and $R_6$ is preferably sulfo. $R_7$ preferably has the meaning nitro, methyl, methoxy or chlorine.

The use of a compound of the formula

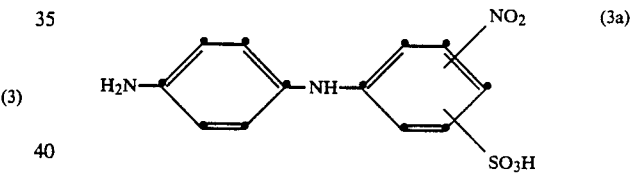

is particularly preferred in process steps (b) and (d).

In the compounds of the formula (4), $R_8$ preferably has the meaning hydrogen, chlorine, methyl or methoxy and $R_9$ is preferably nitro, chlorine, methyl, methoxy or hydrogen.

In a particularly preferred embodiment of the process according to the invention, the compound of the formula (4) in (c) is o-, m- or, in particular, p-nitroaniline.

The workup of the produce obtained according to (c) or (d) affords the metal-free polyazo dye. However, the dye mixture obtained according to (c) or (d) is then preferably metallized, for example, with an iron, cobalt, nickel, chromium or copper compound to give the respective 1:1 or 1:2 iron, cobalt, nickel, chromium or copper complexes.

A particularly preferred embodiment of the process according to the invention relates to the metallization of the product obtained according to (c) or (d) in a subsequent step (e) by means of a copper compound.

The diazotization of the compounds of the formula (1) in (a) and also of the compounds of the formulae (3) and (4) in (b), (c) and (d) is carried out each time in a manner known per se, for example by means of nitrite, for example an alkali metal nitrite such as sodium nitrite, under acidic conditions at temperatures of $-5°$ to $25°$ C. and preferably $0°$ to $10°$ C.

The coupling reactions (a), (b), (c) and (d) are likewise carried out under conventional conditions known per se. Advantageously, they are each carried out in an aqueous medium at a slightly acidic, neutral or alkaline pH and at temperatures of about 0° to 25° C., preferably at 0°-10° C. For each of the coupling reactions (a), (b) and (c) a neutral or alkaline medium and, in particular, a slightly alkaline medium is preferred, that is, a medium having a pH of 7.5 to 12 and, in particular, 8 to 9; the pH can be adjusted by the addition of bases, for example alkali metal hydroxides or alkali metal carbonates, ammonia or an amine.

Per mole of the compound of the formula (2), for example, 0.7 to 1.5 mol and preferably 0.8 to 1.2 mol of the compound of the formula (1) is used in (a).

The total amount of the compound of formula (3) used in steps (b) and (d) of the process according to the invention is, for example, 0.7 to 1.5 mol and preferably 0.8 to 1.2 mol per mole of the compound of the formula (2), this compound being used either completely in (b) or certain portions of it in both (b) and (d). A preferred variation of the process according to the invention consists in using the total amount of the compound of the formula (3) in (b), thus omitting the process step (d). However, it is particularly preferred to use only a portion of the total amount of the compound of the formula (3), which must amount to at least 15 mol%, in (b) and to use the remaining amount of 85 mol% at the most in process step (d).

In this variation, it is particularly preferred to use a total of 0 8 to 1.2 mol of the compound of the formula (3) per mole of the compound of the formula (2) in the process, 15 to 50%, preferably 20 to 40%, of which are used in step (b) and the remaining amount, that is 85 to 50%, and, preferably, 80 to 60%, in (d).

Per mole of the compound of the formula (2), for example, 0.5 to 1.5 mol and, preferably, 0.65 to 1.2 mol of the compound of the formula (4) are used in process step (c).

The metallization of the product obtained according to (c) or (d) is carried out in a manner known per se, for example in an aqueous medium at temperatures of 10° to 100° C., preferably 20°-50° C., under atmospheric pressure at a pH of 3 to 12, preferably 4 to 9.

Suitable metal-donating agents are, for example, iron(II) chloride or iron(III) chloride, iron(II) sulfate or iron(III) sulfate and iron(II) nitrate or iron(III) nitrate; cobalt acetate, cobalt sulfate or cobalt chloride, nickel acetate, nickel formate, nickel sulfate or nickel chloride, chromium fluoride, chromium sulfate, chromium acetate, chromium formate or chromium salicylate; or copper carbonate, copper chloride, copper sulfate or copper acetate.

Preferably, copper-donating agents are used as metallizing agents and, of these, in particular copper sulfate.

A preferred embodiment of the process according to the invention comprises
(a) diazotizing 0.8 to 1.2 mole equivalents of a compound of the above-mentioned formula (1a) and coupling the product at a pH of 8.0 to 9.0 onto 1 mole equivalent of 1,3.dihydroxybenzene,
(b) diazotizing 0.8 to 1.2 mole equivalents of a compound of the above-mentioned formula (3a) and coupling the product onto the product obtained according to (a)
(c) coupling the diazo compound from 0.65 to 1.2 mole equivalents of a compound of the abovementioned formula (4) in which $R_8$ is hydrogen, chlorine, methyl or methoxy and $R_9$ independently has the meaning of $R_8$ or is nitro onto the product obtained according to (b) and, if desired, metallizing the product obtained according to (c) by means of a copper compound.

A particularly preferred embodiment of the process according to the invention for the preparation of polyazo dyes comprises
(a) diazotizing 0.8 to 1.2 mole equivalents of a compound of the above-mentioned formula (1a) and coupling the product at a pH of 8.0 to 9.0 onto 1 mole equivalent of 1,3-dihydroxybenzene,
(b) coupling the diazotized compound of the abovementioned formula (3a) onto the product obtained according to (a),
(c) coupling the diazo compound from 0.65 to 1.2 mole equivalents of a compound of the abovementioned formula (4) in which $R_8$ is hydrogen, chlorine, methyl or methoxy and $R_9$ independently has the meaning of $R_8$ or is nitro onto the product obtained according to (b),
(d) coupling a further diazotized compound of the formula (3a) onto the product obtained according to (c) and, if desired,
(e) metallizing the product obtained according to (d) by means of a copper compound,
the total amount of the compound of the formula (3a) used in (b) and (d) being 0.8 to 1.2 mole equivalents and 20 to 40% thereof being used in process step (b) and the remaining 80 to 60% in process step (d).

The polyazo dyes obtainable by the above processes and representing a complex mixture of various components are isolated in the form of their salts, in particular the alkali metal salts, in particular sodium salts or potassium salts, or ammonium salts or salts of organic amines having a positively charged nitrogen atom.

The dyes obtainable by the process according to the invention represent readily water-soluble anionic dyes which are in general suitable for dyeing textile and non-textile substrates dyeable by anionic dyes, for example for dyeing fibre material of natural or regenerated cellulose, natural or synthetic polyamides, polyurethanes or cationically modified polyolefins, furthermore anodized aluminium or leather and pelts.

The dyes obtainable by means of the process can be used advantageously, for example, for dyeing bonded cellulose fibre webs, wood and paper. Suitable fibre materials are in particular cotton and natural polyamides such as wool and silk, while nylon and cationically modified polypropylene are predominant among the synthetic fibre materials.

The polyazo dyes obtained according to the invention are preferably suitable for dyeing pelts and in particular leather, all types of grain leathers and suede leathers, for example chrome leather, retanned leather or suede leather from goat, sheep, cattle and pig being suitable.

Predominantly brown dyeings having good general fastness properties are obtained, for example having light, water, wash, perspiration, dry cleaning, acid, alkali, solvent and diffusion fastness with respect to plasticized PVC. The dyes according to the invention are tinctorially strong and have good hiding power; they have good affinity and a high resistance to electrolytes such as sodium ions or calcium ions and also to chromium salts and furthermore have good build-up properties on pure chrome leather as well as on retanned leather. The comparably high water-solubility of the dyes obtained according to the invention is particularly worth mentioning.

The examples which follow serve to illustrate the invention without limiting it thereto. Parts and percentages are by weight.

EXAMPLE 1

18.8 parts of 2-amino-6-nitrophenol-4-sulfonic acid are diazotized in a manner known per se in an acidic medium with sodium nitrite and subsequently stirred into a solution of 9.6 parts of 1,3-dihydroxy-benzene in 175 parts of water and 15 parts of anhydrous sodium carbonate at 0°–5° C.; during this addition, the pH is kept slightly alkaline (pH 8.0–9.0) by the addition of sodium hydroxide solution. After the coupling is completed, the diazo compound obtained from 9 parts of 4'-amino-4-nitro-diphenylamine-2-sulfonic acid is added and the pH of this 2nd coupling is again kept slightly alkaline by the addition of sodium hydroxide solution. The diazo compound obtained from 11 parts of 4-nitroaniline is then run into the solution of the resulting disazo dye, during which the reaction medium is kept slightly alkaline by the addition of sodium hydroxide solution. After the 3rd coupling is completed, the diazo compound from a further 20.6 parts of 4'-amino-4-nitrodiphenylamine-2-sulfonic acid is added, and the reaction medium is again kept slightly alkaline by means of sodium hydroxide. After the 4th coupling is completed, the resulting dye suspension is warmed to 20° C. and adjusted to a weakly acidic pH by means of hydrochloric acid. An aqueous solution containing 27 parts of copper(II) sulfate is then run in, and the mixture is stirred for another 2 hours. The dye is then salted out by means of a mixture of potassium chloride and sodium chloride, filtered off and dried. The resulting dark powder dyes leather in a brown shade having good general fastness properties.

EXAMPLE 2

The procedure as in Example 1 is repeated, except that in the 2nd coupling step the total amount of 29.6 parts of 4'-amino-4-nitrodiphenylamine-2-sulfonic acid is used and the 4th coupling step is omitted, to give a dye which dyes leather a reddish brown shade having good general fastness properties.

EXAMPLE 3

The procedure as described in Example 1 or 2 is repeated, except that the metallization step is omitted and the reaction mixture is worked up directly after the last coupling, to give likewise dyes which dye leather a brown shade having good general fastness properties.

EXAMPLE 4

The procedure as described in Example 1 is repeated, except that the suspension of the trisazo dye mixture obtained after the 4th coupling is made neutral with hydrochloric acid, the entire mixture is heated to 50° C. and over a period of about 20 minutes 25.5 parts of iron(III) chloride are stirred in. A weakly acidic pH (about 3–5) is then established by the addition of 30% strength sodium hydroxide solution, the reaction mixture is heated to about 95° C. and maintained at this temperature for about 1 hour. After cooling, the dye which is the iron complex of the dye according to Example 1 is salted out in a conventional manner, filtered off and dried. It dyes leather in a brown shade having good general fastness properties.

DYEING PROCEDURE FOR LEATHER 100 parts of garment suede leather are drummed at 50° C. in a solution of 1000 parts of water and 2 parts of 24% strength ammonia for 2 hours and subsequently dyed at 60° C. in a solution of 1000 parts of water, 2 parts of 24% strength ammonia and 3 parts of dye according to Example 1 for 1 hour. A solution of 40 parts of water and 4 parts of 85% strength formic acid is then added and dyeing is continued for another 30 minutes. The leather is then thoroughly rinsed and treated additionally, if desired, with 2 parts of a dicyanodiamide/formaldehyde condensation product for 30 minutes at 50° C. This gives a brown dyeing having good fastness properties.

I claim:

1. A process for the preparation of polyazo dyes, wherein (a) a compound of the formula

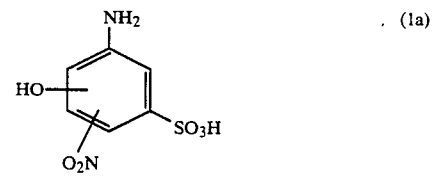
(1a)

is diazotized and coupled onto a compound of the formula

(2)

in which $R_3$ and $R_4$, independently of one another, are hydroxyl or amino, (b) a compound of formula

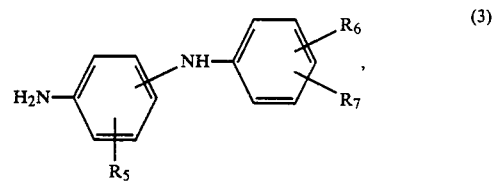
(3)

in which $R_5$ and $R_6$, independently of one another, are hydrogen or sulfo and $R_7$ is nitro, $C_1$–$C_4$alkyl, $C_1$–$C_4$alkoxy or halogen, is diazotized and coupled onto the product obtained according to (a), (c) a compound of the formula

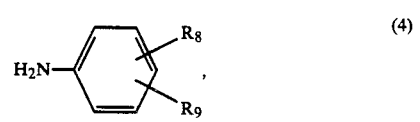
(4)

in which $R_8$ is hydrogen, $C_1$–$C_4$alkyl, $C_1$–$C_4$alkoxy, halogen, carboxy or sulfo and $R_9$ independently has the meaning of $R_8$ or is nitro, is diazotized and coupled onto the product obtained according to (b), (d) a further compound of the abovementioned formula (3) is diazotized and coupled onto the product obtained according to (c), and (e) the product obtained according to (d) is metallized with an iron, cobalt, nickel, chromium or copper compound, wherein the total amount of the compound of formula (3) used in steps (b) and (d) is 0.7 to 1.5 moles per mole of the compound of formula (2) and 15 to 50% of which are used in step (b) and the remaining amount, that is 85 to 50%, is used in step (d).

2. A process according to claim 1 wherein the metallization step (e) is omitted.

3. A process according to claim 1, wherein $R_3$ and $R_4$ in formula (2) are each hydroxyl.

4. A process according to claim 1, wherein in process steps (b) and (d) a compound of the formula

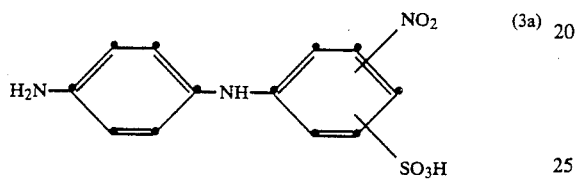

is used.

5. A process according to claim 1, wherein $R_8$ is hydrogen, chlorine, methyl or methoxy and $R_9$ independently has the meaning of $R_8$ or is nitro.

6. A process according to claim 1, wherein o-, m- or, p-nitroaniline is used in (c) as compound of the formula (4).

7. A process according to claim 1, wherein the product obtained according to (c) or (d) is metallized by means of a copper compound.

8. A process according to claim 1, wherein the coupling reaction (a) is carried out at a pH of 8.0 to 9.0.

9. A process according to claim 1, wherein per mole of the compound of the formula (2), 0 7 to 1.5 mol of the compound of the formula (1) in (a), 0.5 to 1.5 mol of the compound of the formula (4) in (c) and a total of 0.7 to 1.5 mol of the compound of the formula (3) in (b) and (d) together are used, at least 15 mol% of the total amount used of the compound of the formula (3) being used in process step (b) and any remaining amount being used in (d).

10. A process according to claim 1, wherein the total amount of the compound of the formula (3) used in process steps (b) and (d) is 0.8 to 1.2 mol per mole of the compound of the formula (2) and 20 to 40% thereof are used in (b) and the remaining amount of 80 to 60% used in (d).

11. A process according to claim 1 for the preparation of polyazo dyes, which comprises (a) diazotizing 0.8 to 1.2 mole equivalents of a compound of the formula (1a) and coupling the product at a pH of 8.0 to 9.0 onto 1 mole equivalent of 1,3-dihydroxybenzene, (b) coupling the diazotized compound of the formula

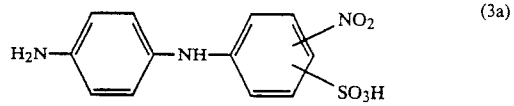

onto the product obtained according to (a), (c) coupling the diazo compound obtained from 0.65 to 1.2 mole equivalents of a compound of the formula (4) in which $R_8$ is hydrogen, chlorine, methyl or methoxy and $R_9$ independently has the meaning of $R_8$ or is nitro onto the product obtained according to (b), (d) coupling a further diazotized compound of the formula (3a) onto the product obtained according to (c) and (e) metallizing the product obtained according to (d) by means of a copper compound, the total amount of the compound of the formula (3a) used in (b) and (d) being 0.8 to 1.2 mole equivalents and 20 to 40% thereof being used in process step (b) and the remaining 80 to 60% in process step (d).

12. A process according to claim 11, wherein the metallization step (e) is omitted.

13. A process according to claim 11, wherein the compound of the formula (4) in (c) is o-, m- or p-nitroaniline.

14. A process for the preparation of polyazo dyes according to claim 1, wherein (a) 0.8 to 1.2 mol equivalents of 2-amino-6-nitrophenol-4-sulfonic acid are diazotized and coupled at a pH of 8.0 to 9.0 onto 1 mole equivalent of 1,3-dihydroxybenzene, (b) 4'-amino-4-nitrodiphenylamine-2-sulfonic acid is diazotized and coupled onto the product obtained according to (a), (c) 0.65 to 1.2 mole equivalents of 4-nitroaniline are diazotized and coupled onto the product obtained according to (b), (d) further 4'-amino-4-nitrodiphenylamine-2-sulfonic acid is diazotized and coupled onto the product obtained according to (c), and (e) the product obtained according to (d) is metallized with a copper compound, the total amount of 4'-amino-4-nitrodiphenylamine-2-sulfonic acid used in (b) and (d) being 0.8 to 1.2 mole equivalents and 20 to 40% thereof being used in process step (b) and the remaining 80 to 60% in process step (d).

* * * * *